E. C. STRANGE.
Seed-Planter.
No. 215,689. Patented May 20, 1879.
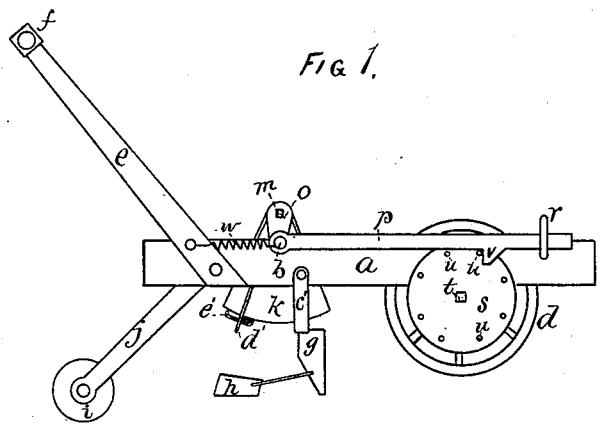
Fig. 1.
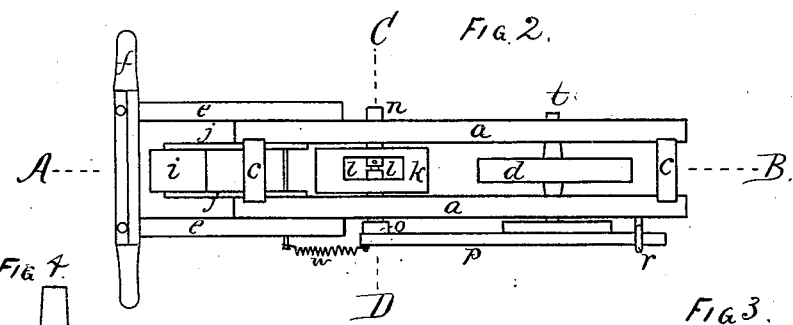
Fig. 2.
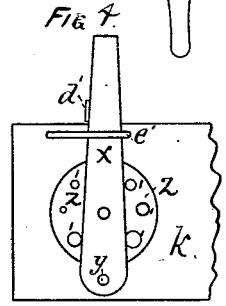
Fig. 3.
Fig. 4.
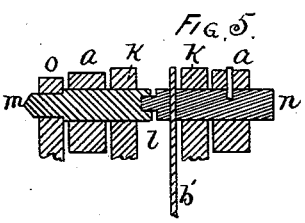
Fig. 5.
WITNESSES.
Samuel D. Kilby,
Eugene Humphrey
INVENTOR.
Emerson C. Strange
By Porter & Hutchinson
Attys

UNITED STATES PATENT OFFICE.

EMERSON C. STRANGE, OF TAUNTON, MASSACHUSETTS.

IMPROVEMENT IN SEED-PLANTERS.

Specification forming part of Letters Patent No. 215,689, dated May 20, 1879; application filed July 5, 1878.

*To all whom it may concern:*

Be it known that I, EMERSON C. STRANGE, of Taunton, State of Massachusetts, have invented Improvements in Seed-Planters, of which the following is a specification.

This invention relates to that class of seeding-machines in which are embodied a pilot or ground wheel and a seed receptacle or carrier provided with suitable automatically-actuated devices for effecting the escape of the seed from the carrier at the required periods and in the desired quantities, such seed-dropping devices being so connected with the ground-wheel as to be actuated by the rotary motion thereof as it passes over the ground; and the invention consists in certain devices and the combinations thereof or therewith, as will be hereinafter more fully described and claimed.

Figure 1 is a side elevation of a seed-planter embodying my invention. Fig. 2 is a top or plan view of the same. Fig. 3 is a detached vertical section of the seed-carrier, taken in the direction of line A B, Fig. 2. Fig. 4 is a detached enlarged view of the under side of the carrier, the valve-lever, and valve-plate. Fig. 5 is an enlarged detached vertical section as taken on line C D, Fig. 2.

In the drawings, $a\ a$ represent the sides of the frame, united by the cross-bars $c\ c$. $d$ is the pilot or ground wheel, its axle $t$ being journaled in sides $a\ a$. $e\ e$ are the handles, united by hand-bar $f$. $g$ is the colter or drill-opener, secured to frame $a$. $h$ is the seed-coverer, and $i$ the smoothing-roll, pivoted in arms $j\ j$. $k$ is the seed-carrier, having the opening $l$ in the upper portion thereof, and journaled upon the male and female members $m\ n$ of the arbor. $o$ is a crank secured to member $m$ of this arbor. $p$ is a connecting-rod journaled upon wrist-pin $b$ of crank $o$, and extending forward through the keeper or guide $r$, which is formed to admit a rising-and-falling movement without lateral variation.

$s$ is a disk rigidly secured on axle $t$. In the outer face of this disk are secured a series of pins, $u$, which, as the pilot-wheel rolls over the ground, are brought in contact with the shoulder $v$ on rod $p$, thereby imparting to it a forward and slightly-rising motion. As each pin passes this shoulder the coiled spring $w$ draws back rod $p$. Thus the action of wheel $s$, with its pins $u$ and springs $w$, tend to impart to carrier $k$ a swinging or vibrating movement. $x$ is the valve-lever, pivoted to the under side of carrier $k$ at $y$, as shown in Fig. 4. $z$ is the valve-plate centrally pivoted to lever $x$, as shown, and having arranged equidistant around its pivoted center a series of varying-sized seed-passages, marked 1.

The valve-lever $x$ is secured in place by the keeper $e'$, as shown in Fig. 4. Spring $d'$, secured to carrier $k$, throws the lever $x$ forward, as shown in Figs. 1 and 4.

When the carrier $k$ is swung forward, by the means described, the free end of lever $x$ is brought in contact with the stop $c'$, and is thereby swung back in keeper $e'$, whereby the proper hole in plate $z$ will be brought in coincidence with passage $a'$ in the bottom of carrier $k$, and the seed will pass through into the drill.

When pin $u$ passes shoulder $v$ the carrier swings back, and spring $d'$ throws lever $x$ forward, thereby causing plate $z$ to close passage $a'$ in the bottom of the carrier.

By adjusting plate $z$ upon its pivot, so as to bring the proper sized hole in coincidence with passage $a'$, any sized seeds may be planted.

Rod $b'$ is secured to the non-rotating member $n$ of the axis of the carrier $k$, and serves, by the swinging of the carrier, to stir the seeds therein as they are carried past the rod, and so prevents their clogging passage $a'$.

I do not claim a rotary seed-carrier; but

I do claim as my invention—

1. The combination of vibrating carrier $k$, valve $z$, with its lever $x$, stop $c'$, and spring $d'$, all combined and arranged to operate substantially as described, and for the purposes specified.

2. In a seeding-machine, the combination of vibrating carrier $k$, vibrating lever $x$, and valve-plate $z$, pivoted upon and vibrating with lever $x$, and provided with a series of various-sized seed-passages, arranged around the pivoted center, all substantially as described, and for the purposes specified.

3. In a seeding-machine, and in combination with the vibrating seed-carrier $k$, the divided shaft $m\ n$, one part being rotative and the other part non-rotative, and the rod $b'$, rigidly fixed in such non-rotative part, all substantially as described, and for the purposes specified.

EMERSON C. STRANGE.

Witnesses:
 EUGENE HUMPHREY,
 T. W. PORTER.